United States Patent
Hotta et al.

[11] Patent Number: 6,033,335
[45] Date of Patent: Mar. 7, 2000

[54] PLANETARY GEAR MECHANISM

[75] Inventors: Takashi Hotta; Tadami Kondoh; Motonori Ohnuki; Kazuya Kubo, all of Wako, Japan

[73] Assignee: Honda Giken Kogyo Kabushiki Kaisha, Tokyo, Japan

[21] Appl. No.: 09/181,636

[22] Filed: Oct. 29, 1998

[30] Foreign Application Priority Data

Oct. 30, 1997 [JP] Japan .................................. 9-298054

[51] Int. Cl.[7] ...................................................... F16H 3/44
[52] U.S. Cl. .......................................... 475/269; 192/3.28
[58] Field of Search .................................. 475/269, 346, 475/347, 275, 276; 192/3.28, 3.29

[56] References Cited

U.S. PATENT DOCUMENTS

| | | | |
|---|---|---|---|
| 3,529,494 | 9/1970 | Matte | 475/347 |
| 4,369,674 | 1/1983 | Hamane et al. | 475/347 |
| 4,494,414 | 1/1985 | Hamano | 475/347 |
| 5,792,020 | 8/1998 | Kikuchi et al. | 475/346 |

*Primary Examiner*—Charles A. Marmor
*Assistant Examiner*—Tisha D. Waddell
*Attorney, Agent, or Firm*—Nikaido Marmelstein Murray & Oram LLP

[57] ABSTRACT

A ring gear support member is supported radially immovably on the outer circumference of an input shaft through a ball bearing. A brake hub of a reverse brake, as supported by the ring gear support member, is made movable in the circumferential direction relative to the ring gear support member and is urged to a center position by a coil spring. When the reverse brake is applied to couple the ring gear support member unrotatably to a casing, the brake hub is supported through the coil spring by the ring gear support member. As a result, the meshing vibration, as generated at the meshing portion between pinions and a ring gear, can be prevented from being transmitted to the casing through the brake hub, thereby reducing noise.

9 Claims, 9 Drawing Sheets

PLANETARY GEAR MECHANISM

DETAILED DESCRIPTION OF THE INVENTION

1. Technical Field to which the Invention Belongs

The present invention relates to a planetary gear mechanism equipped with brake means for restricting the rotation of a ring gear or the rotations of planetary carriers.

2. Prior Art

FIG. 9 shows a planetary gear mechanism of the prior art, which is provided in a forward/backward selector mechanism of a continuously variable belt type transmission.

A planetary gear mechanism 01 is constructed to include a sun gear 03 splined to an input shaft 02. Planetary carriers $04_1$ and $04_2$ are supported relatively rotatably by the input shaft 02. An inner pinion 05 and an outer pinion 06 are supported rotatably by the planetary carriers $04_1$ and $04_2$. A ring gear support member 07 is supported relatively rotatably by the input shaft 02. A ring gear 08 is formed integrally with the ring gear support member 07. The inner pinion 05 meshes with the sun gear 03 whereas the outer pinion 06 meshes with the ring gear 08, and the inner pinion 05 and the outer pinion 06 mesh with each other. In order to restrict the ring gear 08 when a vehicle is in reverse, the ring gear support member 07 is coupled to a casing 09 by a reverse brake 010.

In the planetary gear mechanism of the prior art, however, the ring gear 08 is formed integrally with the ring gear support member 07, and the reverse brake 010 couples the ring gear support member 07 directly to the casing 09. As a result, when the reverse brake 010 is applied, the meshing vibration generated at the meshing portion between the outer pinion 06 and the ring gear 08 is transmitted from the ring gear support member 07 through the reverse brake 010 to the casing 09 which causes a noise.

SUMMARY OF THE INVENTION

The invention has been conceived in view of the background thus far described and has an object to prevent meshing vibration, which is generated between the pinions and the ring gear of the planetary gear mechanism, from being transmitted to the casing through the brake means.

In order to achieve the above-specified object, according to a feature of the invention, there is provided a planetary gear mechanism comprising a shaft member, a sun gear, planetary carriers, pinions, a ring gear, a ring gear support member and a brake means. The sun gear is for rotating integrally with the shaft member. The planetary carriers are supported relatively rotatably by the shaft member. The pinions are supported rotatably by the planetary carriers and mesh with the sun gear. The ring gear meshes with the pinions. The ring gear support member is integrated with the ring gear and is supported relatively rotatably by the shaft member. The brake means is for restricting the rotation of the ring gear by coupling the ring gear support member unrotatably to the casing through friction plates which are supported by a brake hub. The planetary gear mechanism is characterized in that relative vibration in a circumferential direction between the brake hub and the ring gear support member is damped by supporting the brake hub and the ring gear support member through an elastic member.

According to the construction described above, the brake hub is supported through the elastic member by the ring gear support member when the ring gear support member is unrotatably coupled to the casing through the friction plates by actuating the brake means. As a result, meshing vibration, as generated at the meshing portion between the pinions and the ring gear, can be prevented from being transmitted from the ring gear support member to the casing through the brake hub and the friction plates, thereby reducing noise.

According to another feature of the invention, there is provided a planetary gear mechanism comprising a shaft member, a sun gear, planetary carriers, pinions, a ring gear, a ring gear support member and a brake means. The sun gear is for rotating integrally with the shaft member. The planetary carriers are supported relatively rotatably by the shaft member. The pinions are supported rotatably by the planetary carriers and mesh with the sun gear. The ring gear meshes with the pinions. The ring gear support member is for supporting the ring gear and is supported relatively rotatably by the shaft member. The brake means is for restricting the rotation of the ring gear by coupling the ring gear support member unrotatably to the casing through friction plates supported by a brake hub integrated with the ring gear support member. The planetary gear mechanism is characterized in that relative vibration in a circumferential direction between the ring gear and the ring gear support member is damped by supporting the ring gear and the ring gear support member through an elastic member.

According to the construction described above, the ring gear is supported through the elastic member by the ring gear support member when the ring gear support member is unrotatably coupled to the casing through the friction plates by actuating the brake means. As a result, meshing vibration, as generated at the meshing portion between the pinions and the ring gear, can be prevented from being transmitted from the ring gear to the casing through the ring gear support member and the friction plates, thereby reducing noise.

According to a further feature of the invention, there is provided a planetary gear mechanism comprising a shaft member, a sun gear, planetary carriers, a pinion, a ring gear, and a brake means. The sun gear is for rotating integrally with the shaft member. The planetary carriers are supported relatively rotatably by the shaft member. The pinion is supported rotatably by the planetary carriers and meshes with the sun gear. The ring gear meshes with the pinion. The brake means is for coupling the planetary carriers unrotatably to the casing through friction plates supported by a brake hub. The planetary gear mechanism is characterized in that relative vibration in a circumferential direction between the planetary carriers and the brake hub is damped by supporting the brake hub on the planetary carriers through an elastic member.

According to the construction described above, the brake hub is supported through the elastic member by the planetary carrier when the planetary carrier is unrotatably coupled to the casing by actuating the brake means. As a result, meshing vibration, as generated either at the meshing portion between the pinion and the ring gear or at the meshing portion between the pinion and the sun gear, can be prevented from being transmitted from the planetary carrier to the casing through the brake hub and the friction plates, thereby reducing noise.

DESCRIPTION OF THE PREFERRED EMBODIMENTS

The modes for carrying out the invention will be described in connection with their embodiments with reference to the accompanying drawings.

Figure 1:
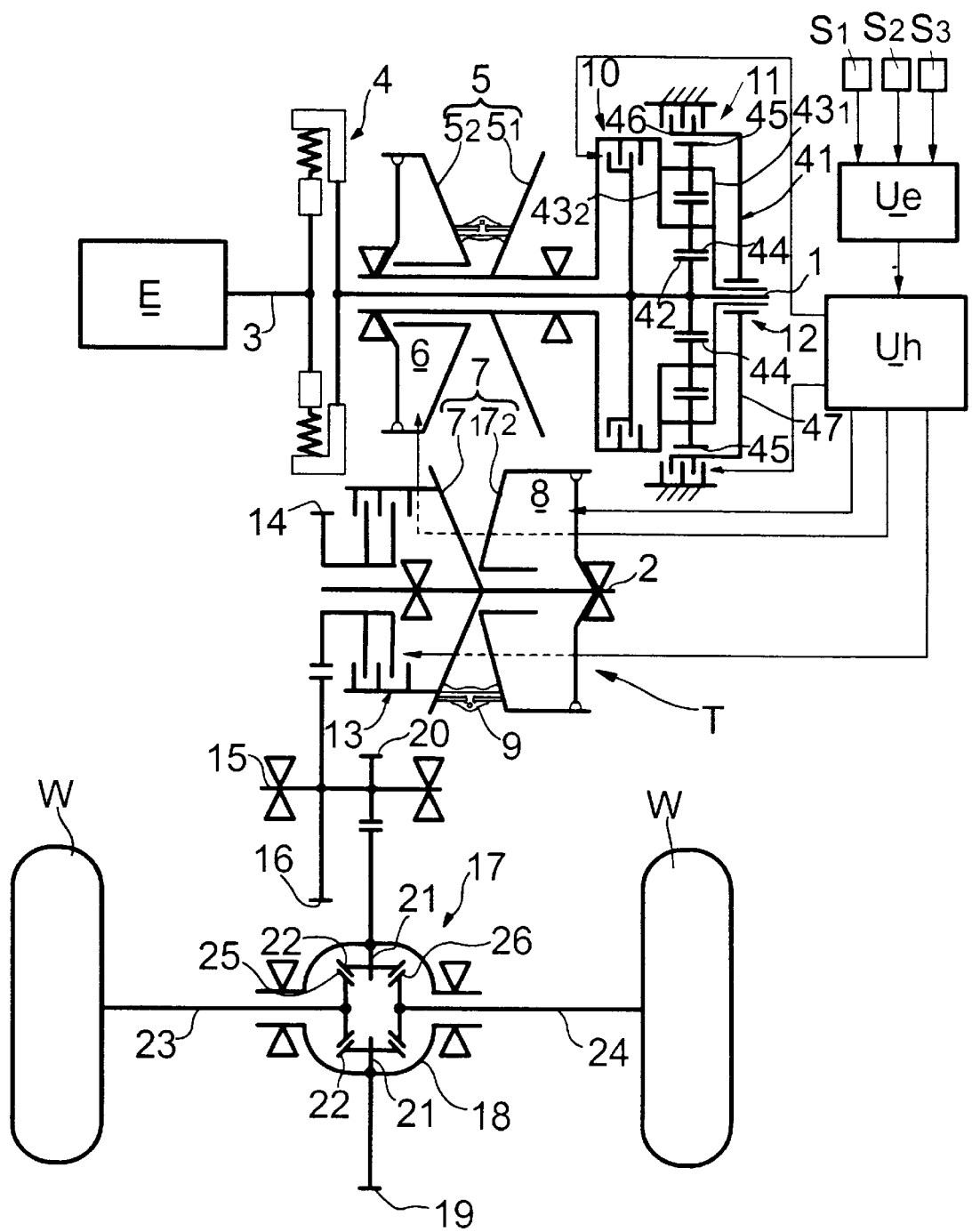
FIG. 1 is a diagram of the entire construction of a continuously variable belt type transmission according to a first embodiment of the present invention.

FIGS. 1 to 4 show a first embodiment of the invention. As shown in FIG. 1, a continuously variable belt type transmission T for a vehicle is equipped with an input shaft 1 and an output shaft 2 which are arranged in parallel. A crankshaft 3 of an engine E is connected at its righthand end to the lefthand end of the input shaft 1 through a damper 4 having a flywheel. A drive pulley $5_1$ as supported by the input shaft $1_1$ is equipped with a rotatable half part $5_1$ of a stationary side pulley which is stationary relative to the input shaft $1_1$ and an axially slidable half part $5_2$ of a movable side pulley which is movable relative to the rotatable half part $5_1$ of the stationary side pulley. A groove width between the half part $5_2$ of the movable side pulley and the half part $5_1$ of the stationary side pulley can be varied by an oil pressure acting in an oil sump 6. A driven pulley 7, as supported by the output shaft 2, is equipped with a half part $7_1$ of a stationary side pulley formed integrally with the output shaft 2 and an axially slidable half part $7_2$ of a movable side pulley which is movable relative to the half part $7_1$ of the stationary side pulley. A groove width between the half part $7_2$ of the movable side pulley and the half part $7_1$ of the stationary side pulley can be varied by an oil pressure acting in an oil sump 8. Between the drive pulley 5 and the driven pulley 7, an endless belt 9 runs and has a number of hooking pieces mounted between two ridges of a strap.

A forward/backward selector mechanism 12 is disposed at the righthand end of the input shaft 1. The forward/backward selector mechanism 12 is equipped with a forward clutch 10 and a reverse brake 11. The forward clutch 10 is applied, when a forward gear stage is to be established, to transmit the rotation of the input shaft 1 in the same direction to the drive pulley 5. This reverse brake 11 is applied, when a reverse gear stage is to be established, to transmit the rotation of the input shaft 1 in the reverse direction to the drive pulley 5.

A starting clutch 13 is disposed at the lefthand end of the output shaft 2. The starting clutch 13 couples a first intermediate gear 14, which is supported rotatably relative to the output shaft 2, to the output shaft 2. An intermediate shaft 15 is arranged in parallel with the output shaft 2, and is equipped with a second intermediate gear 16 to mesh with the first intermediate gear 14. A third intermediate gear 20 is mounted on the intermediate shaft 15, and is made to mesh with an input gear 19 which is disposed in a gear box 18 of a differential 17. Side gears 25 and 26 are mounted on the ends of a left axle 23 and a right axle 24 which are supported rotatably relative to each other in the gear box 18. The side gears 25 and 26 are made to mesh with a pair of pinions 22 and 22 which are supported by the gear box 18 through a pinion shaft 21. Driven wheels W and W are respectively connected to the ends of the left axle 23 and the right axle 24.

Signals from an accelerator opening sensor $S_1$, a vehicle speed sensor $S_2$, and a reverse switch $S_3$ for detecting that a not-shown select lever has selected a reverse range are input to an electronic control unit Ue. Based on the signals from the individual sensors and switch, the electronic control unit Ue outputs control signals to a hydraulic control unit Uh, which controls the groove widths of the drive pulley 5 and the driven pulley 7, that is, the gear ratio of the continuously variable belt type transmission T, the applied state of the forward clutch 10, the applied state of the reverse brake 11 and the applied state of the starting clutch 13.

Figure 2:
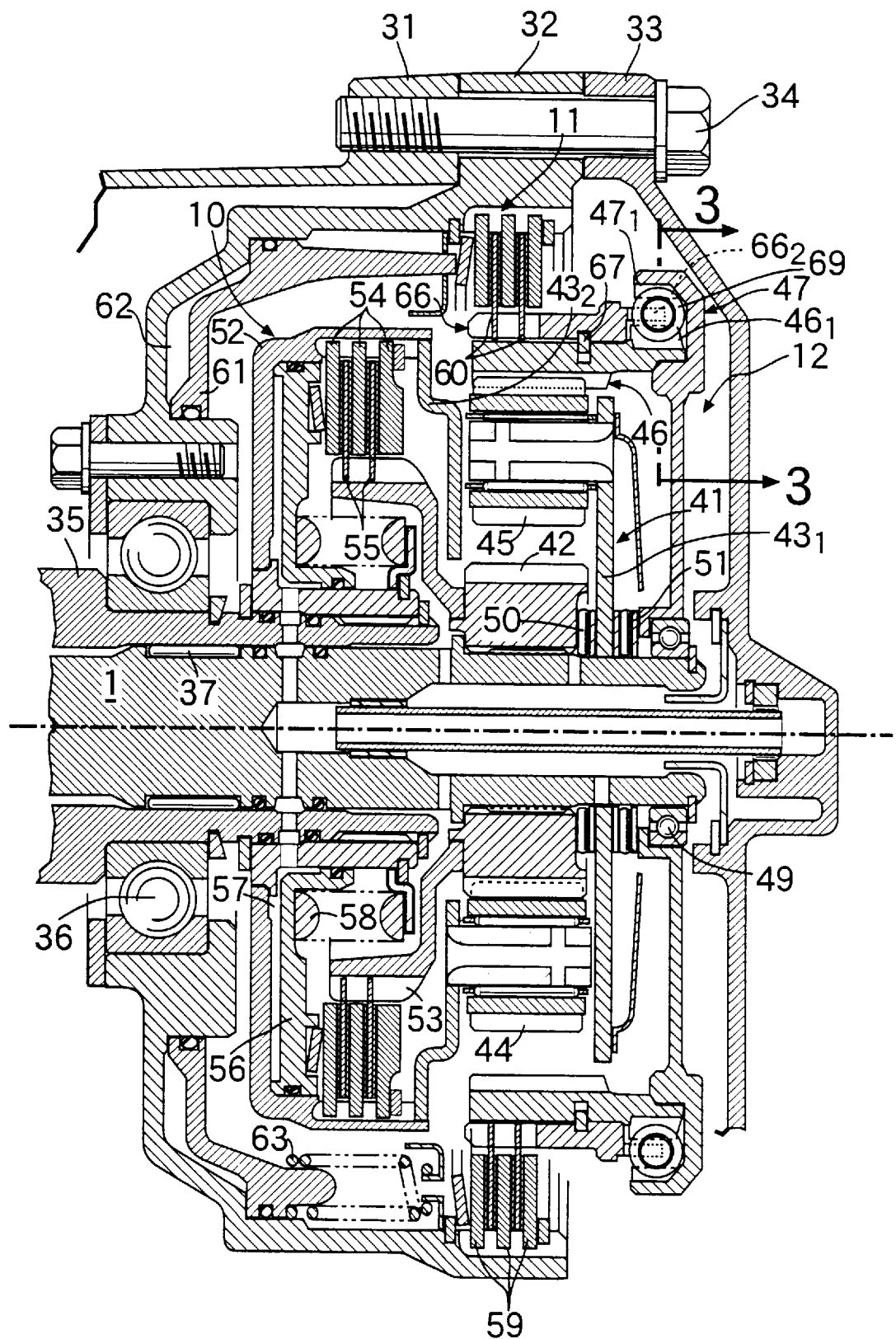
FIG. 2 is an enlarged diagram of an essential portion of FIG. 1.

The structure of the forward/backward selector mechanism 12 will be described with reference to FIG. 2.

At the righthand end portion of the continuously variable belt type transmission T, a center casing 31, a right casing 32 and a right cover 33 are jointed by bolts 34. A sleeve 35, which is made integral with the half part $5_1$ of the stationary side pulley (as shown in FIG. 1) of the drive pulley 5, is supported by the right casing 32 through a ball bearing 36. The input shaft 1 is supported in the sleeve 35 through a needle bearing 37.

A planetary gear mechanism 41, which is disposed at the righthand end of the input shaft 1, is constructed to include a sun gear 42, planetary carriers $43_1$ and $43_2$, three inner pinions 44, three outer pinions 45, and a ring gear support member 47. The ring gear 42 is splined to the input shaft 1. The planetary carriers $43_1$ and $43_2$ are made of a pair of plates supported rotatably relative to the input shaft 1. The three inner pinions 44 are supported rotatably by the planetary carriers $43_1$ and $43_2$ and mesh with the sun gear 42. The three outer pinions 45 are supported rotatably by the planetary carriers $43_1$ and $43_2$ and mesh with the inner pinions 44. The ring gear support member 47 has an integral ring gear 46 meshing with the outer pinions 45 and is supported relatively rotatably by the outer circumference of the input shaft 1. The ring gear support member 47 is rotatably supported at its inner circumference by the outer circumference of the input shaft 1 through a ball bearing 49. The planetary carrier $43_1$ is axially positioned by a thrust bearing 50, which is arranged between itself and the sun gear 42, and a thrust bearing 51 arranged between itself and the ring gear support member 47. In this embodiment, the ring gear 46 forms part of the ring gear support member 47.

The forward clutch 10 is constructed to include an outer clutch 52, a plurality of clutch plates 54, a plurality of clutch discs 55, a clutch piston 56, a clutch oil sump 57 and a return spring 58. The outer clutch 52 is coupled to the sleeve 35 and the planetary carrier $43_2$ The plurality of clutch plates 54 are supported relatively unrotatably but axially slidably on the inner circumference of the outer clutch 52. The plurality of clutch discs 55 are superposed alternately on the clutch plates 54 and are supported relatively unrotatably but axially slidably on the outer circumference of an inner clutch 53. The clutch piston 56 is supported axially slidably in the outer clutch 52 to bring the clutch plates 54 and the clutch discs 55 into alternate engagements. The clutch oil sump 57 is formed between the clutch piston 56 and the outer clutch 52 and is for urging the clutch piston 56 into engagement The return spring 58 is for urging the clutch piston 56 out of engagement.

The reverse brake 11 is constructed to include a plurality of brake plates 59, a plurality of brake discs 60, a brake piston 61, a brake oil sump 62 and a return spring 63. The plurality of brake plates 59 are supported relatively unrotatably but axially slidably on the inner face of the right casing 32. The plurality of brake discs 60 are superposed alternately on the brake plates 59 and are supported relatively unrotatably but axially slidably on the outer circumference of a brake hub 66. The brake piston 61 is supported axially slidably in the right casing 32 and brings the brake plates 59 and the brake discs 60 into engagement. The brake oil sump 62 is formed between the brake piston 61 and the right casing 32 and is for urging the brake piston 61 into engagement. The return spring 63 is for urging the brake piston 61 out of engagement.

Figure 3:
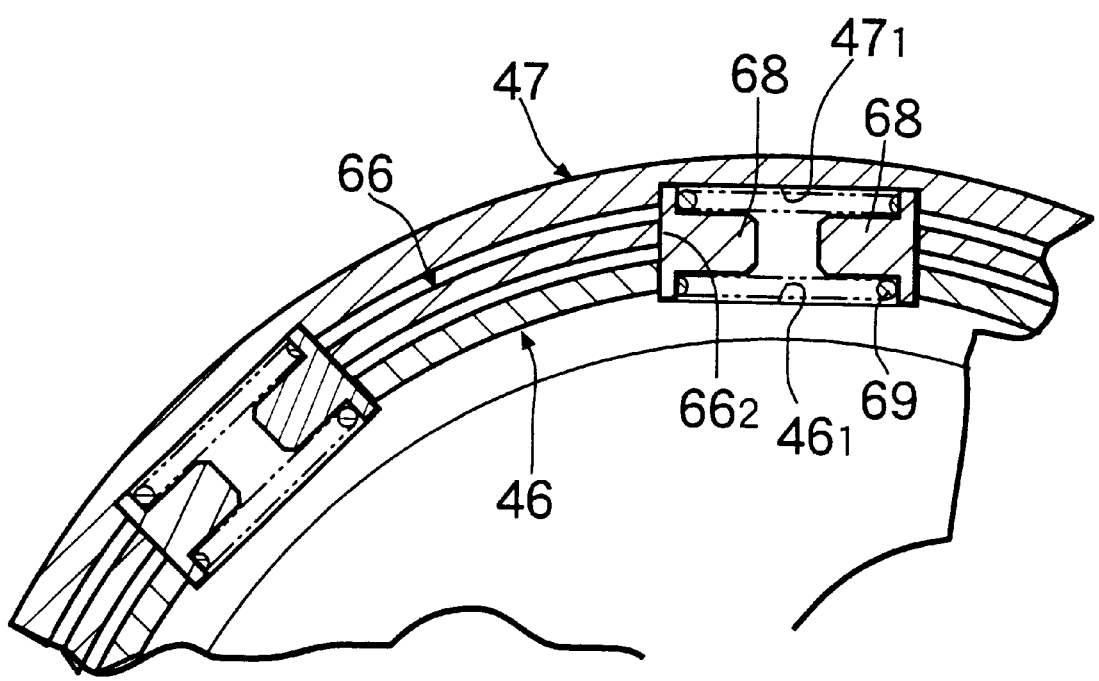
FIG. 3 is an enlarged sectional view taken along line 3—3 of FIG. 2.

As apparent from additional reference to FIG. 3, the ring gear support member 47 and the ring gear 46 are integrally welded. Also, the brake hub 66 of the reverse brake 11, which is supported on the radial outer circumference of the ring gear 46, is retained rotatably relative to the ring gear 46 but axially immovably by a snap ring 67. The ring gear 46 and the ring gear support member 47 are provided with pluralities of recesses $46_1$ and $47_1$ which are arranged at a predetermined circumferential spacing. A coil spring 69 is sandwiched in compression between spring seats 68 and 68 which are retained on the two circumferential ends of the two recesses $46_1$ and $47_1$ facing each other. Moreover, the brake hub 66 is provided with a plurality of notches $66_2$ which are arranged at a predetermined circumferential spacing. Each notch $66_2$ abuts at its two ends against the spring seats 68 and 68 of the coil spring 69. As a result, the coil spring 69 is compressed through one of the paired spring seats 68 and 68 when the brake hub 66 is turned in either direction relative to the ring gear 46 and the ring gear support member 47.

The operation of the embodiment of the invention having the construction thus far described will now be described.

When the forward range is selected by the select lever, the forward clutch 10 is applied at first in response to a command from the electronic control unit Ue so that the inner clutch 53 and the outer clutch 52 are coupled. As a result, the input shaft 1 is integrally coupled to the drive pulley 5 through the sun gear 42, the inner clutch 53, the clutch discs 55, the clutch plates 54, the outer clutch 52 and the sleeve 35. Subsequently, the starting clutch 13 applies the torque of the engine E to the driven wheels W and W through the input shaft 1, the drive pulley 5, the endless belt 9, the driven pulley 7, the output shaft 2 and the differential 17 so that the vehicle is moved forward.

When the reverse range is selected by the select lever, the reverse brake 11 is applied in response to a command from the electronic control unit Ue, so that the ring gear support member 47 and the ring gear 46 are coupled to the right casing 32 and fixed unrotatably. The inner pinions 44 and the outer pinions 45, which mesh with the rotating sun gear 42 and the fixed ring gear 46, revolve together with the planetary carriers $43_1$ and $43_2$ while rotating on their axis. As a result, the drive pulley 5, which is coupled to the planetary carriers $43_1$ and $43_2$ through the outer clutch 52 and the sleeve 35, is driven backward to the rotating direction of the input shaft 1, so that the vehicle is moved backward.

When the vehicle is thus started, the oil pressure, which is fed to the oil sump 6 of the drive pulley 5, is raised in response to a command from the electronic control unit Ue, so that the half part $5_2$ of the movable side pulley of the drive pulley 5 comes close to the half part $5_1$ of the stationary side pulley to increase the effective radius. The oil pressure, which is fed to the oil sump 8 of the driven pulley 7, is lowered so that the half part $7_2$ of the movable side pulley of the driven pulley 7 separates from the half part $7_1$ of the stationary side pulley to decrease the effective radius. As a result, the gear ratio of the continuously variable belt type transmission T is continuously changed from the LOW side to the OD (over drive) side.

When the reverse brake 11 is applied so that the vehicle runs backward, meshing vibration, which is generated at the meshing portions between the ring gear 46 and the outer pinions 45, in a circumferential direction is transmitted from the ring gear 46 to the ring gear support member 47. Due to the extensions/contractions of the coil springs 69, which are sandwiched among the ring gear 46, the ring gear support member 47 and the brake hub 66, the meshing vibration is absorbed and prevented from being transmitted to the brake hub 66. Even when the reverse brake 11 is applied to couple the brake hub 66 to the right casing 32, vibration of the ring gear 46 and the ring gear support member 47 is prevented from being transmitted to the right casing 32, thereby lowering noise.

If the brake hub 66 were fixed on the ring gear support member 47, the circumferential meshing vibration generated at the meshing portions between the ring gear 46 and the outer pinions 45 would be transmitted to the right casing 32 through the reverse brake 11 in the applied state. On the contrary, in this embodiment, the brake hub 66 is elastically supported with respect to the ring gear 46 and the ring gear support member 47, so that noise can be effectively reduced by preventing the transmission of the meshing vibration.

Figure 4:
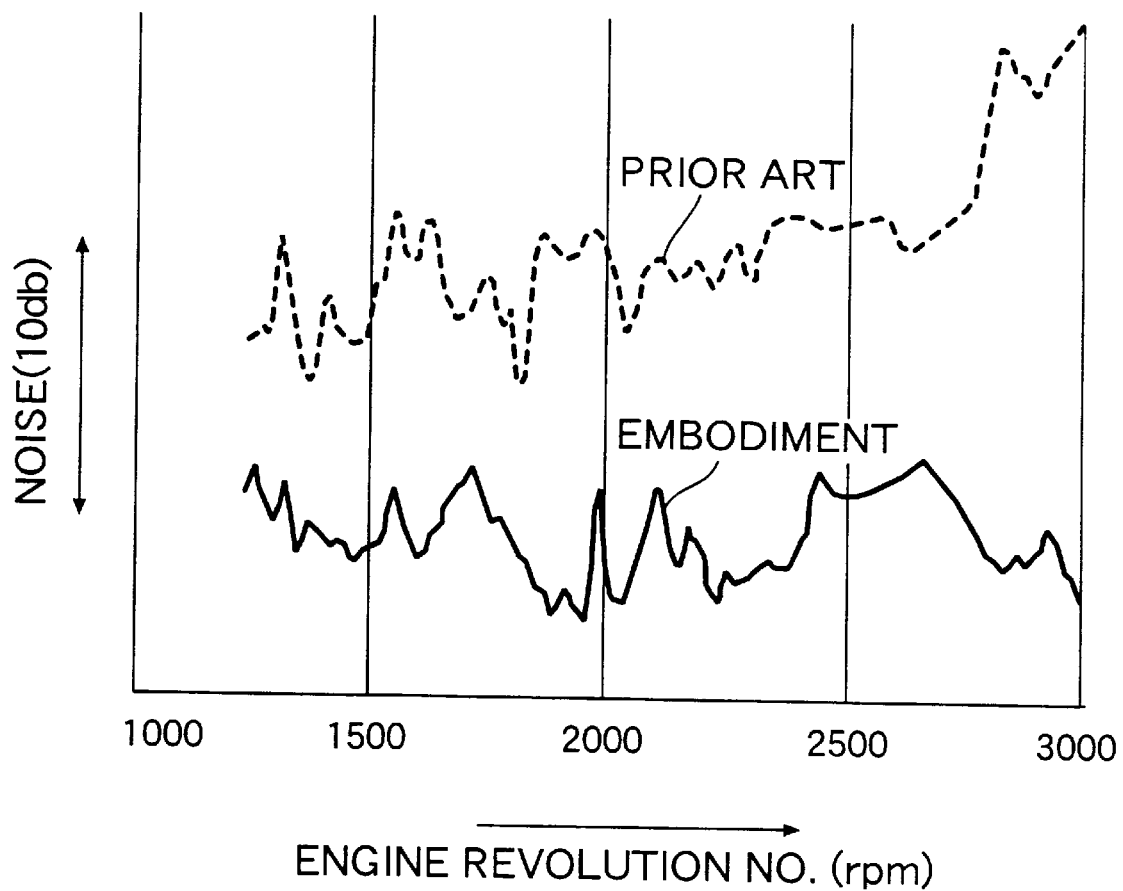
FIG. 4 is a graph illustrating the effects of the present invention.
Figure 9:
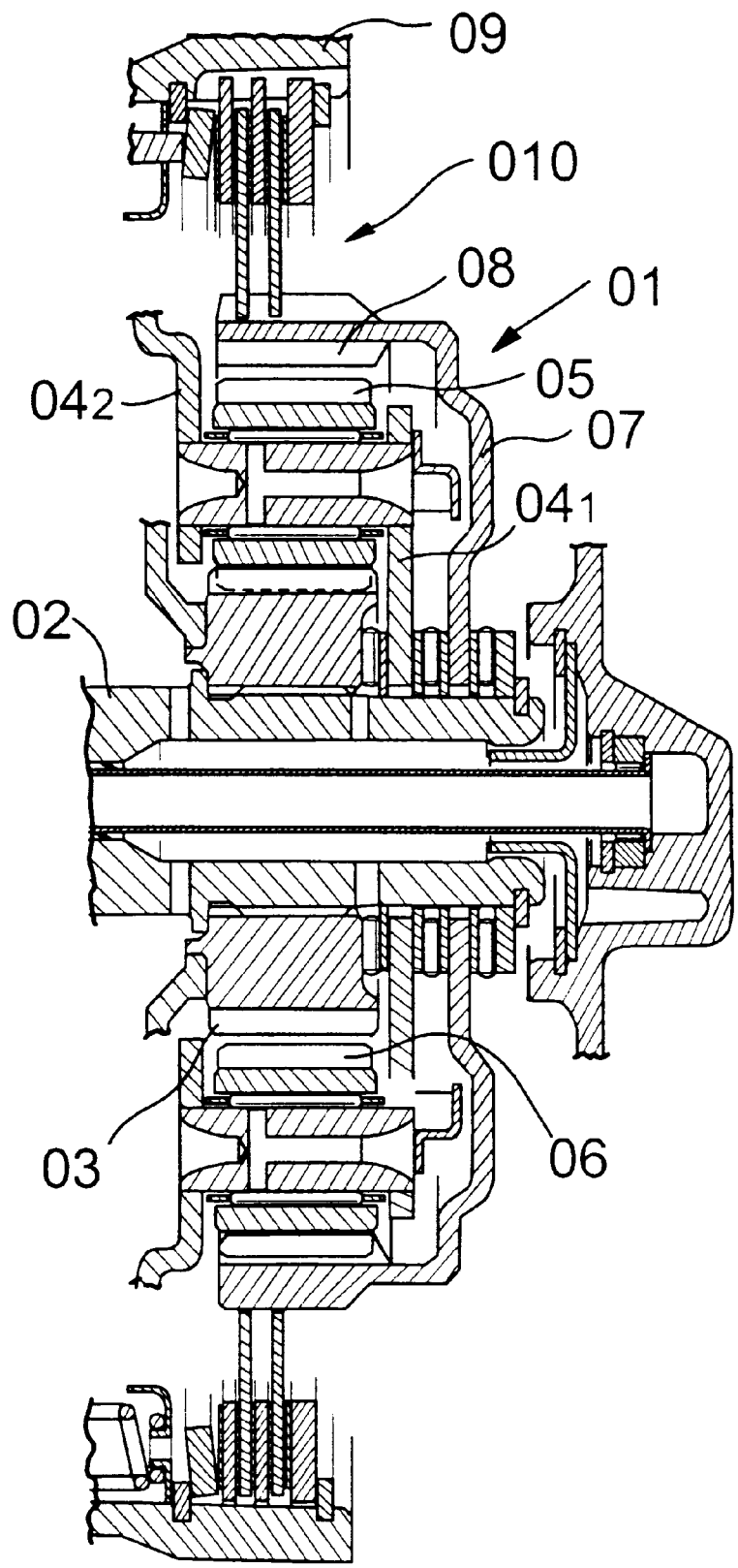
FIG. 9 is a longitudinal sectional view of a planetary gear mechanism according to the prior art.

FIG. 4 illustrates the effect of this embodiment. The abscissa indicates the engine revolution number whereas the ordinate indicates the noise in the vehicle compartment when the reverse gear stage is established. It is found that the noise of this embodiment, as indicated by a solid line, is at a lower level than that of the prior art (such as shown in FIG. 9), which is indicated by a broken line.

Figure 5:
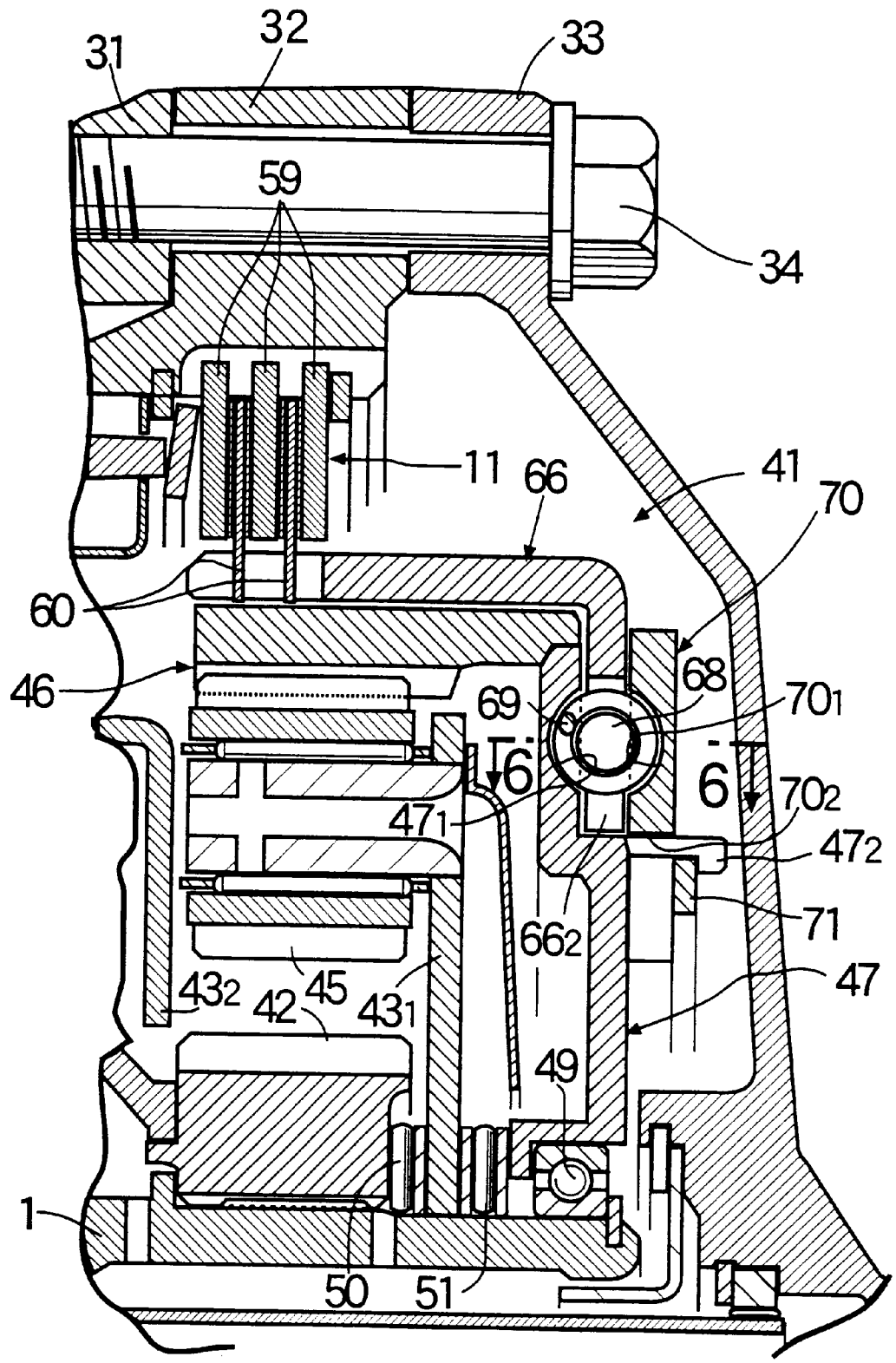
FIG. 5 is a diagram according to a second embodiment of the present invention and corresponding to the essential portion of FIG. 2.
Figure 6:
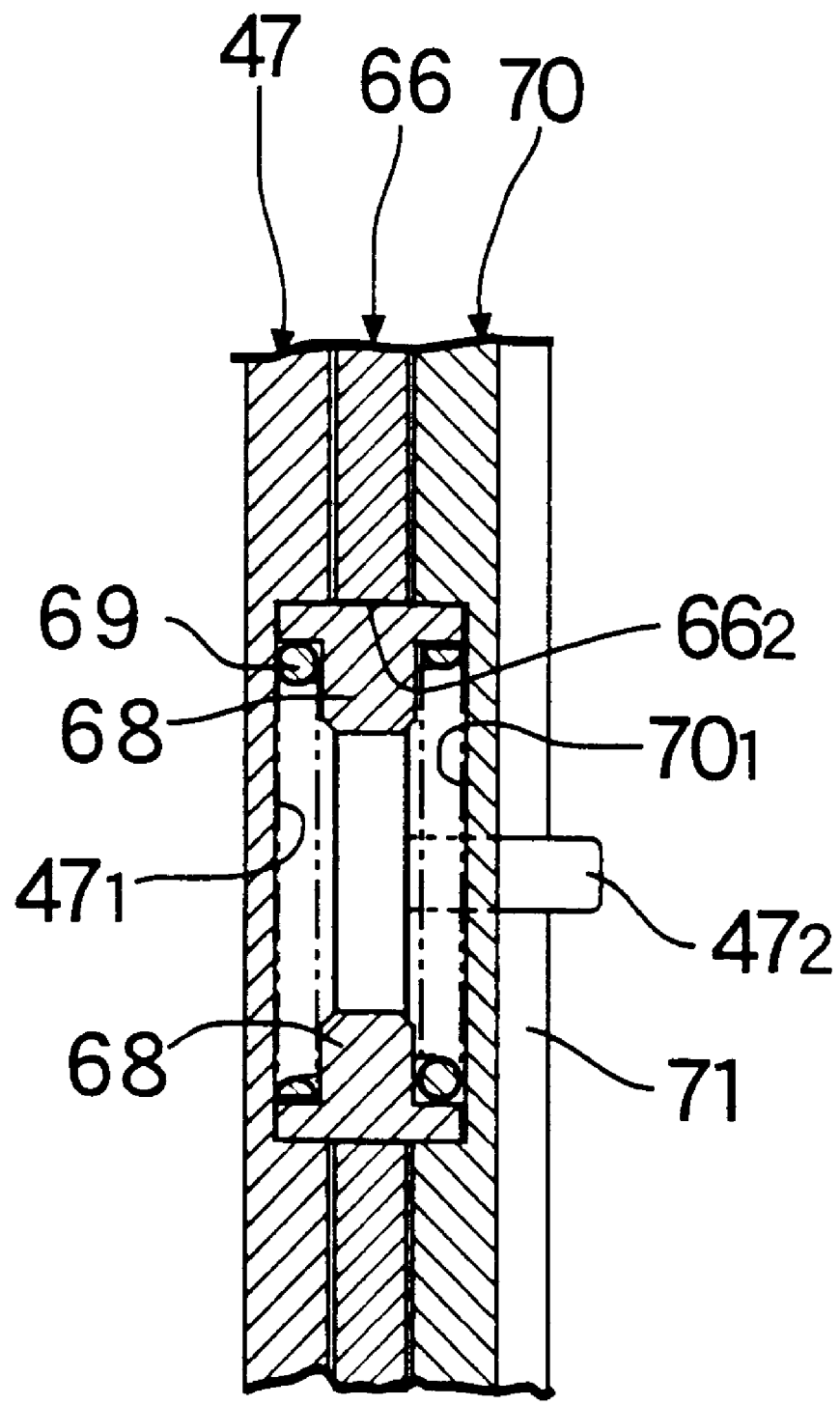
FIG. 6 is a sectional view taken along line 6—6 of FIG. 5.

A second embodiment of the invention will be described with reference to FIGS. 5 and 6.

In the foregoing first embodiment, the brake hub 66 is elastically rotatably supported relative to the ring gear 46 and the ring gear support member 47 which are integrally jointed. In this second embodiment, however, the brake hub 66 is elastically rotatably supported relative to the ring gear support member 47. Specifically, a plurality of notches 702, which are formed in the inner circumference of a ring plate 70, are made to engage with a plurality of support projections 472, which are projected rightward from the radially intermediate portion of the ring gear support member 47. The support projections 472 are prevented from coming out by a snap ring 71. Pluralities of recesses $47_1$ and $70_1$ are formed in the confronting faces of the ring gear support member 47 and the ring plate 70, respectively. The coil spring 69 is sandwiched in compression between the spring seats 68 and 68 which are retained on the two circumferential ends of the two confronting recesses $47_1$ and $70_1$. The brake hub 66 is rotatably supported relatively between the confronting faces of the ring gear support member 47 and the ring plate 70. The plurality of notches $66_2$, which are formed at predetermined circumferential spacing in the inner circumference of the brake hub 66, abut at their two ends against the spring seats 68 and 68 of the coil spring 69.

According to the second embodiment, the coil spring 69 is also compressed through one of the paired spring seats 68 and 68 when the brake hub 66 rotates in any direction relative to the ring gear support member 47. As a result, the vibration, as transmitted from the ring gear 46 to the ring gear support member 47, is absorbed by the coil springs 69, so that the vibration is prevented from being transmitted from the brake hub 66 to the right casing 32 through the reverse brake 11, thereby preventing noise.

Figure 7:
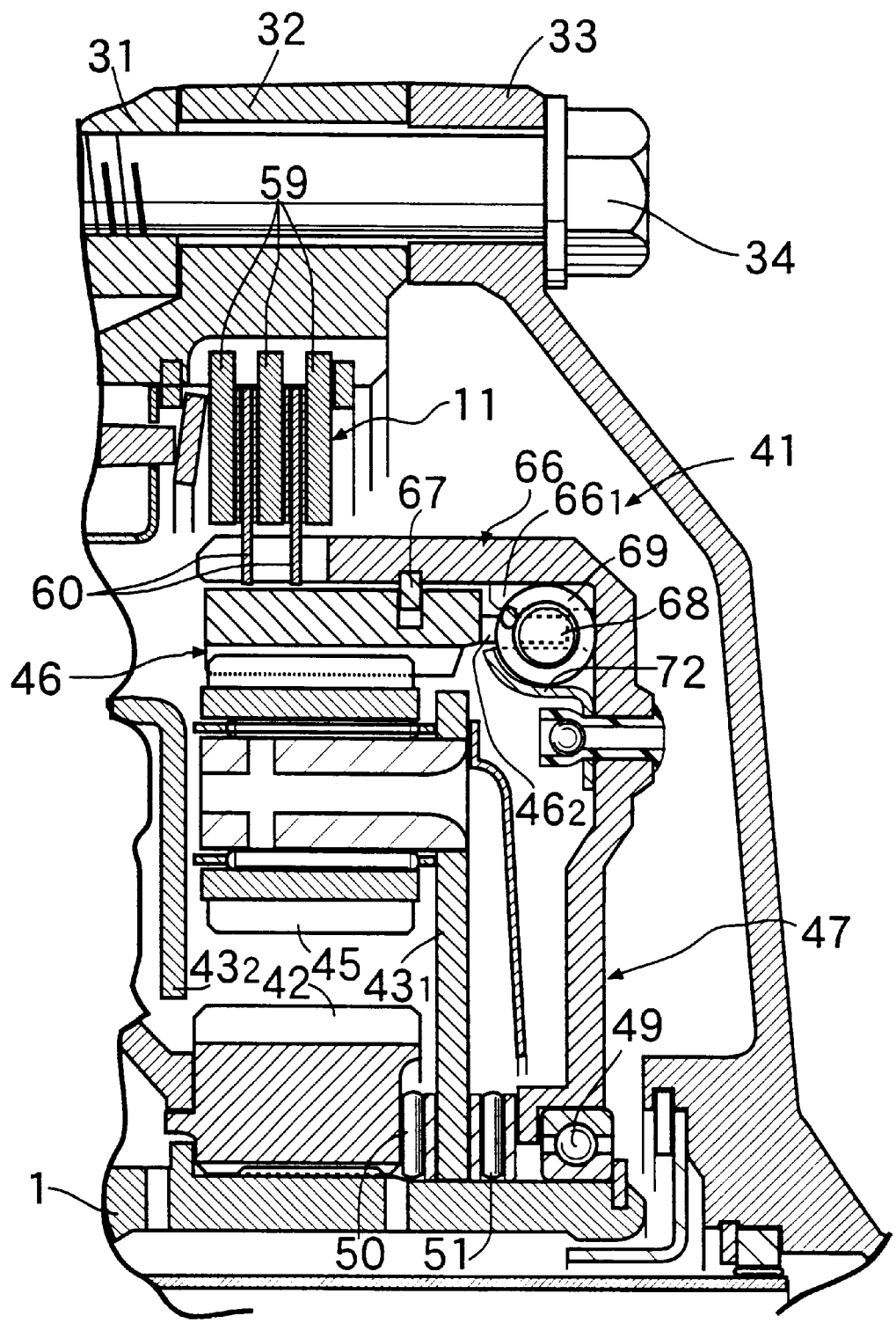
FIG. 7 is a diagram according to a third embodiment and corresponding to the essential portion of FIG. 2.

A third embodiment of the invention will be described with reference to FIG. 7.

The ring gear support member 47 of this third embodiment is integrated with the brake hub 66. The ring gear 46 is retained relatively rotatably but axially immovably on the inner circumference of the brake hub 66 by the snap ring 67. A plurality of recesses $66_1$ are formed in the brake hub 66. The coil spring 69 is sandwiched in compression between the spring seats 68 and 68 which are retained on the two circumferential ends of each recesses $66_1$. The coil spring 69 is supported and prevented from coming out by the coil spring support holder 72 which is fixed on a ring gear support member 47. Moreover, the two ends of a plurality of notches $46_2$, which are formed at a predetermined spacing in the righthand end of the ring gear 46, abut against the spring seats 68 and 68 of the coil spring 69. In this embodiment, the brake hub 66 forms part of the ring gear support member 47.

According to the third embodiment, vibration, which is generated in the ring gear 46 meshing with the outer pinions 45, is not transmitted to the brake hub 66 as a result of the interference of the coil springs 69 so that the vibration is prevented, even if the reverse brake 11 is applied, from being transmitted to the right case 32, thereby reducing noise.

Figure 8:
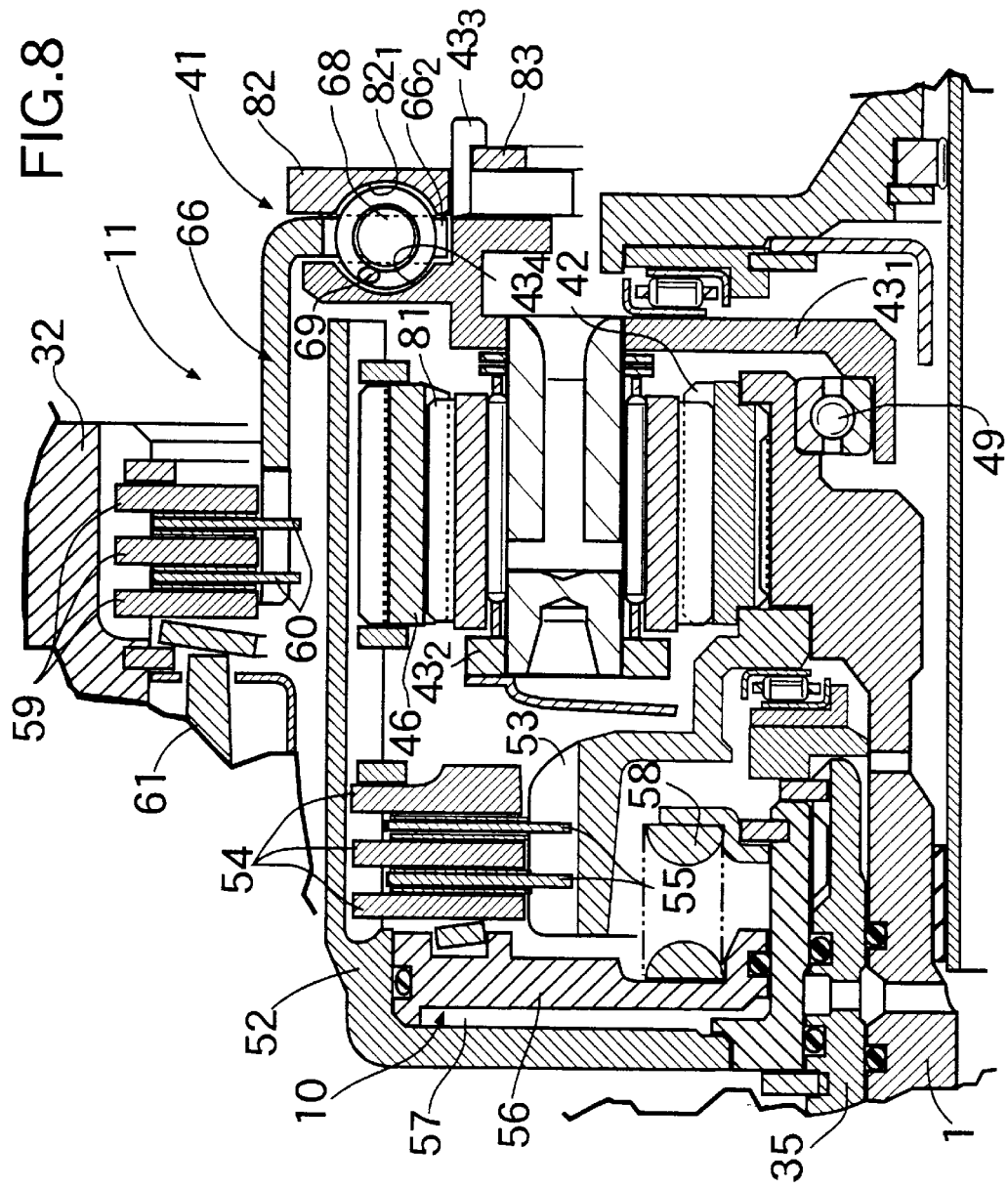
FIG. 8 is a diagram according to a fourth embodiment and corresponding to the essential portion of FIG. 2.

A fourth embodiment of the invention will be described with reference to FIG. 8.

The planetary gear mechanism 41 of the fourth embodiment is of the single pinion type, in which a pinion 81 supported by the planetary gears $43_1$ and $43_2$ is made to mesh with the sun gear 42 and the ring gear 46 simultaneously. This planetary gear mechanism 41 is not equipped with the ring gear support member 47 so that the ring gear 46 is supported by the outer clutch 52 of the forward clutch 10. A ring plate 82, which is supported by projections 433 formed on the righthand side planetary carrier $43_1$, is prevented from coming out by a snap ring 83. The coil spring 69 is supported at its two ends through the spring seats 68 and 68, respectively, by pluralities of recesses $43_4$ and $82_1$ formed in the confronting faces of the planetary carrier $43_1$ and the snap ring 83. Moreover, the brake hub 66 of the reverse brake 11 is clamped relatively rotatably between the planetary carrier $43_1$ and the ring plate 82. The plurality of notches $66_2$, which is formed in the brake hub 66, individually abut against the spring seats 68 and 68.

When the forward clutch 10 couples the inner clutch 53 and the outer clutch 52, the input shaft 1 is connected directly to the sleeve 35 to establish the forward gear stage. When the reverse brake 11 is applied, on the other hand, the planetary carriers $43_1$ and $43_2$ are coupled to the right casing 32. As a result, the rotation of the sun gear 42, which is integrated with the input shaft 1, is transmitted as the backward rotation to the ring gear 46 through the pinion 81 so that the sleeve 35 is reversed to the ring gear 46 through the pinion 81 so that the sleeve 35 is reversed through the outer clutch 52, which is integrated with the ring gear 46, to establish the reverse gear stage.

When the reverse clutch 11 is established, meshing vibration, which is generated either at the meshing portions between the pinions 81 and the sun gear 42 or at the meshing portions between the pinions 81 and the ring gear 46, is transmitted to the planetary carriers $43_1$ and $43_2$ Since the coil springs 69 are sandwiched between the planetary gear $43_1$ and the brake hub 66, however, the meshing vibration is prevented from being transmitted to the right casing 32 through the applied reverse brake 11, thereby reducing noise.

According to one feature of the invention, the brake hub is supported through the elastic member by the ring gear support member when the ring gear support member is unrotatably coupled to the casing through the friction plates by actuating the brake means. As a result, meshing vibration, which is generated at the meshing portion between the pinions and the ring gear, can be prevented from being transmitted from the ring gear support member to the casing through the brake hub and the friction plates, thereby reducing noise.

According to another feature of the invention, the ring gear is supported through the elastic member by the ring gear support member when the ring gear support member is unrotatably coupled to the casing through the friction plates by actuating the brake means. As a result, meshing vibration, which is generated at the meshing portion between the pinions and the ring gear, can be prevented from being transmitted from the ring gear to the casing through the ring gear support member and the friction plates, thereby reducing noise.

According to a further feature of the invention, the brake hub is supported through the elastic member by the planetary carrier when planetary carrier is unrotatably coupled to the casing by actuating the brake means. As a result, meshing vibration, which is generated either at the meshing portion between the pinion and the ring gear or at the meshing portion between the pinion and the sun gear, can be prevented from being transmitted from the planetary carrier to the casing through the brake hub and the friction plates, thereby reducing noise.

Although the invention has been described in detail in connection with its embodiment, it could be modified in design in various manners without departing from the gist thereof.

What is claimed is:

1. A planetary gear mechanism comprising:

a shaft member;

a sun gear for rotating integrally with the shaft member;

planetary carriers supported relatively rotatably by the shaft member;

pinions supported rotatably by the planetary carriers and meshing with the sun gear;

a ring gear meshing with the pinions;

a ring gear support member integrated with the ring gear and supported relatively rotatably by the shaft member; and brake means for restricting the rotation of the ring gear by coupling the ring gear support member unrotatably to a casing through friction plates supported by a brake hub, wherein relative vibration in a circumferential direction between the brake hub and the ring gear support member is damped by supporting the brake hub on the ring gear support member through an elastic member.

2. A planetary gear mechanism according to claim 1, wherein said ring gear and said ring gear support member are each provided with a plurality of recesses and one said elastic member is retained within adjoining recesses.

3. A planetary gear mechanism comprising:

a shaft member;

a sun gear for rotating integrally with the shaft member;

planetary carriers supported relatively rotatably by the shaft member;

pinions supported rotatably by the planetary carriers and meshing with the sun gear;

a ring gear meshing with the pinions;

a ring gear support member for supporting the ring gear and supported relatively rotatably by the shaft member; and brake means for restricting the rotation of the ring gear by coupling the ring gear support member unrotatably to a casing through friction plates supported by a brake hub integrated with the ring gear support member, wherein relative vibration in a circumferential direction between the ring gear and the ring gear support member is damped by supporting the ring gear on the ring gear support member through an elastic member.

4. A planetary gear mechanism according to claim 3, wherein said ring gear support member including a plurality of recesses, a ring plate including a plurality of notches, said ring plate engaging projections projecting from said ring gear support member, and said elastic member sandwiched between confronting recesses and notches.

5. A planetary gear mechanism according to claim 3, further comprising an elastic member support holder, which is fixed on said ring gear support member, for holding said elastic member.

6. A planetary gear mechanism comprising:

a shaft member;

a sun gear for rotating integrally with the shaft member;

planetary carriers supported relatively rotatably by the shaft member;

a pinion supported rotatably by the planetary carriers and meshing with the sun gear;

a ring gear meshing with the pinion; and brake means for coupling the planetary carriers unrotatably to a casing through friction plates supported by a brake hub, wherein relative vibration in a circumferential direction between the planetary carriers and the brake hub is damped by supporting the brake hub on the planetary carriers through an elastic member.

7. A planetary gear mechanism according to claim 1, wherein said ring gear and said brake hub are separate members and disposed adjacent to each other.

8. A planetary gear mechanism according to claim 3, wherein said ring gear and said brake hub are separate members and disposed adjacent to each other.

9. A planetary gear mechanism according to claim 1, wherein said ring gear and said brake hub are in engagement with each other.

* * * * *